US009124881B2

(12) United States Patent
Lubell et al.

(10) Patent No.: US 9,124,881 B2
(45) Date of Patent: Sep. 1, 2015

(54) METHOD OF DISPLAYING AN ENHANCED THREE-DIMENSIONAL IMAGES

(75) Inventors: Keith Lubell, New York, NY (US); M. Henry Jones, New York, NY (US)

(73) Assignee: Fly's Eye Imaging LLC, New York, NY (US)

( * ) Notice: Subject to any disclaimer, the term of this patent is extended or adjusted under 35 U.S.C. 154(b) by 674 days.

(21) Appl. No.: 12/928,127

(22) Filed: Dec. 3, 2010

(65) Prior Publication Data

US 2012/0140024 A1 Jun. 7, 2012

(51) Int. Cl.
*H04N 13/02* (2006.01)
*H04N 13/04* (2006.01)
*H04N 13/00* (2006.01)

(52) U.S. Cl.
CPC ....... *H04N 13/0406* (2013.01); *H04N 13/0022* (2013.01); *H04N 13/0029* (2013.01); *H04N 13/0228* (2013.01); *H04N 13/0275* (2013.01); *H04N 13/026* (2013.01); *H04N 13/0221* (2013.01); *H04N 13/0232* (2013.01)

(58) Field of Classification Search
CPC .................................................... H04N 19/597
USPC .......................................................... 348/53
See application file for complete search history.

(56) References Cited

U.S. PATENT DOCUMENTS

| | | | |
|---|---|---|---|
| 4,495,443 A | | 1/1985 | Cummings |
| 6,097,394 A | * | 8/2000 | Levoy et al. ................... 345/419 |
| 6,137,937 A | | 10/2000 | Okano |
| 6,483,644 B1 | | 11/2002 | Gottfried |
| 6,943,920 B2 | | 9/2005 | Edgar |
| 7,215,731 B1 | * | 5/2007 | Basu et al. ......................... 378/4 |
| 7,318,201 B2 | | 1/2008 | Camara et al. |
| 7,339,614 B2 | * | 3/2008 | Gruber et al. .............. 348/218.1 |
| 7,420,590 B2 | * | 9/2008 | Matusik et al. ................ 348/159 |
| 7,532,361 B2 | | 5/2009 | Yano |
| 7,612,833 B2 | | 11/2009 | Kim |
| 7,643,552 B2 | | 1/2010 | Saishu et al. |
| 7,688,376 B2 | | 3/2010 | Kondo et al. |
| 7,705,886 B2 | | 4/2010 | Harada et al. |
| 7,719,621 B2 | | 5/2010 | Tsuboi et al. |
| 7,965,936 B2 | * | 6/2011 | Raskar et al. .................. 396/268 |
| 8,019,215 B2 | * | 9/2011 | Georgiev et al. .............. 396/276 |
| 8,217,956 B1 | * | 7/2012 | Jin .................................. 345/585 |
| 8,290,358 B1 | * | 10/2012 | Georgiev ....................... 396/326 |
| 8,340,453 B1 | * | 12/2012 | Chen et al. ..................... 382/254 |
| 2007/0154082 A1 | | 7/2007 | Rhodes |
| 2007/0230944 A1 | * | 10/2007 | Georgiev ....................... 396/322 |
| 2008/0030573 A1 | | 2/2008 | Ritchey |

(Continued)

OTHER PUBLICATIONS

Dodgson, Neil. "Autostereoscopic 3D Displays". (Aug. 2005) Computer, vol. 38, Iss. 8, p. 31-36.*

(Continued)

*Primary Examiner* — Sath V Perungavoor
*Assistant Examiner* — Kate Luo
(74) *Attorney, Agent, or Firm* — Schmidt LLC

(57) ABSTRACT

The present invention relates to an image-capturing apparatus and methods, a recording medium, a program and a display device that allows for the displaying of enhanced integral images. In particular, the present invention relates to an information processing apparatus and methods, a recording medium, a program and a display device and a display method which provide images of an object having enhanced three-dimensional resolution while allowing various viewpoints of the images.

44 Claims, 12 Drawing Sheets

(56) References Cited

U.S. PATENT DOCUMENTS

| | | |
|---|---|---|
| 2008/0225113 A1 | 9/2008 | Saishu |
| 2009/0041381 A1* | 2/2009 | Georgiev et al. .............. 382/280 |
| 2010/0091093 A1* | 4/2010 | Robinson ........................ 348/47 |
| 2011/0050893 A1* | 3/2011 | Lee et al. ...................... 348/137 |
| 2011/0141227 A1* | 6/2011 | Bigioi et al. .................... 348/36 |
| 2011/0261187 A1* | 10/2011 | Wang et al. ................... 348/113 |
| 2012/0076417 A1* | 3/2012 | Yoshii et al. .................. 382/190 |

OTHER PUBLICATIONS

Joshi et al. "Natural Video Matting using Camera Arrays". (Jul. 2006) ACM Transactions on Graphics. 25(3).*

Jang et al. "Three-dimensional synthetic aperture integral imaging" (Jul. 2002) Optics Letters, vol. 27, No. 13.*

\* cited by examiner

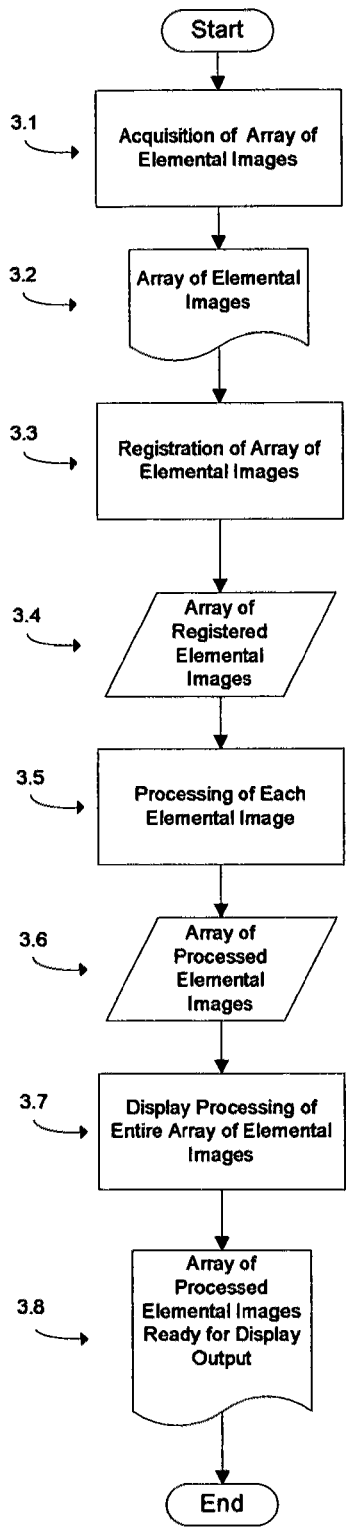

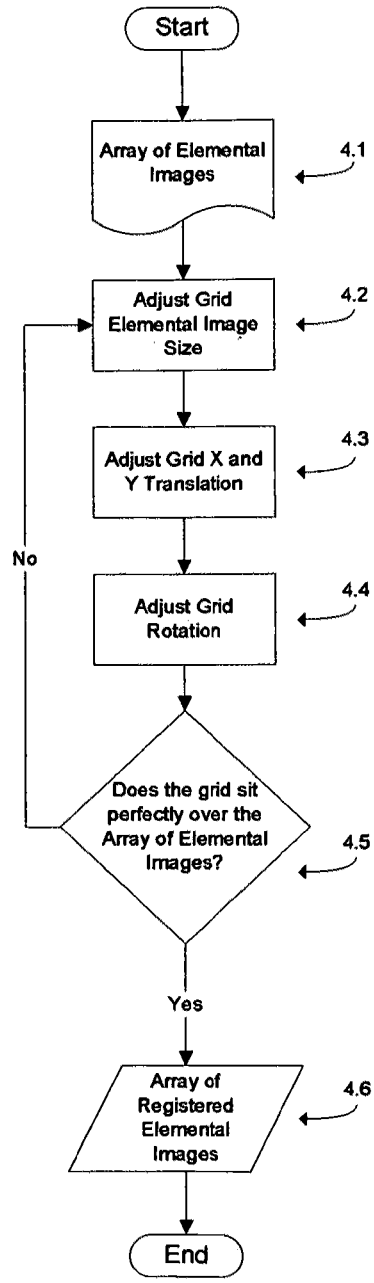

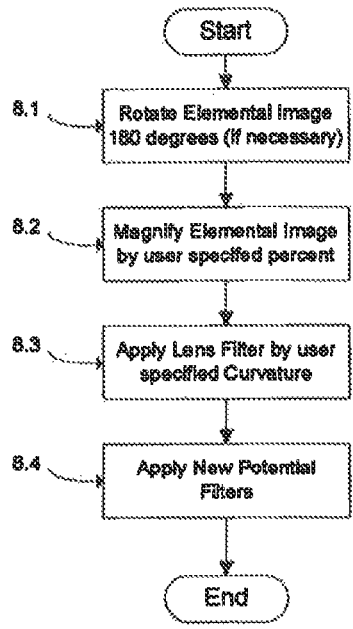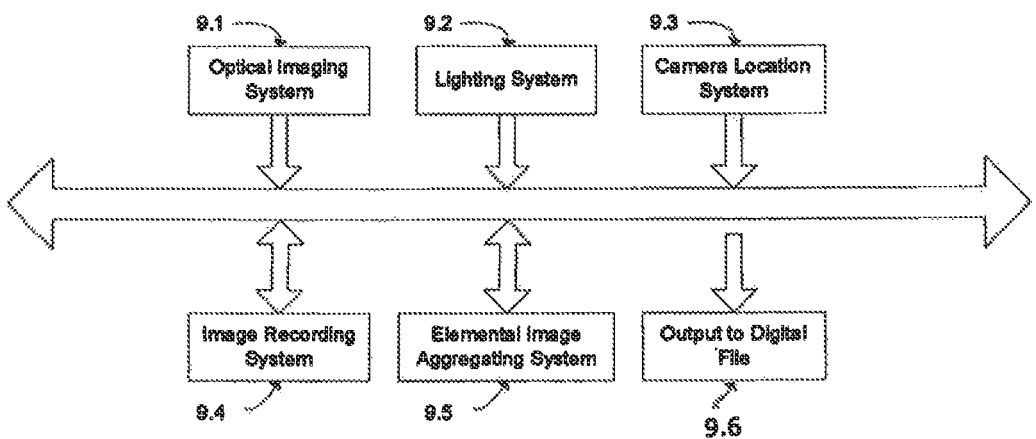

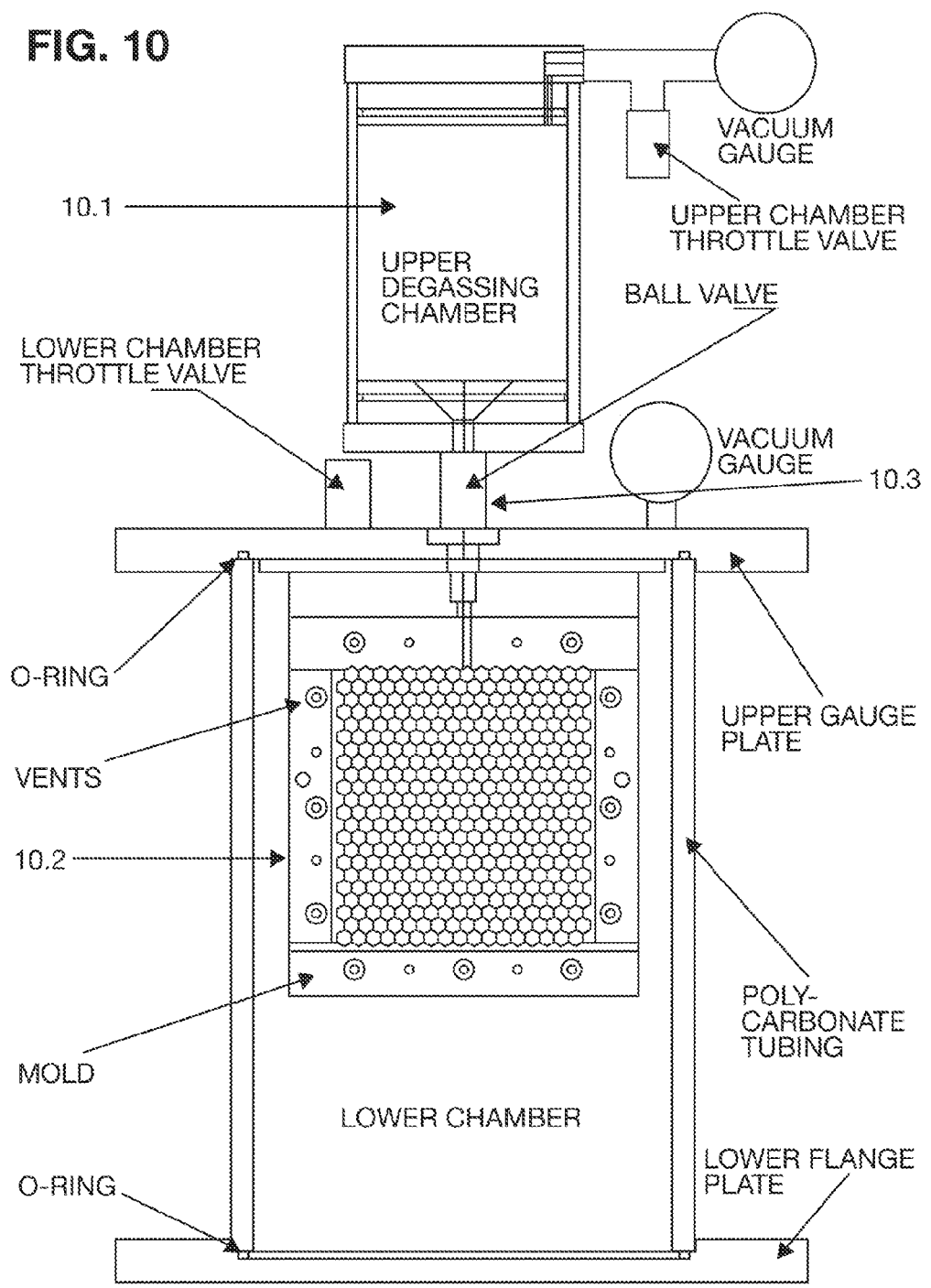

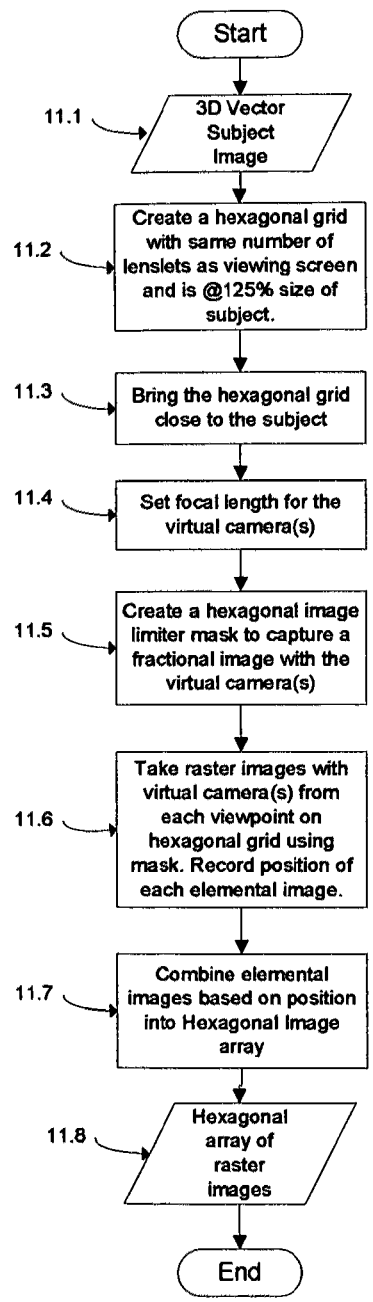

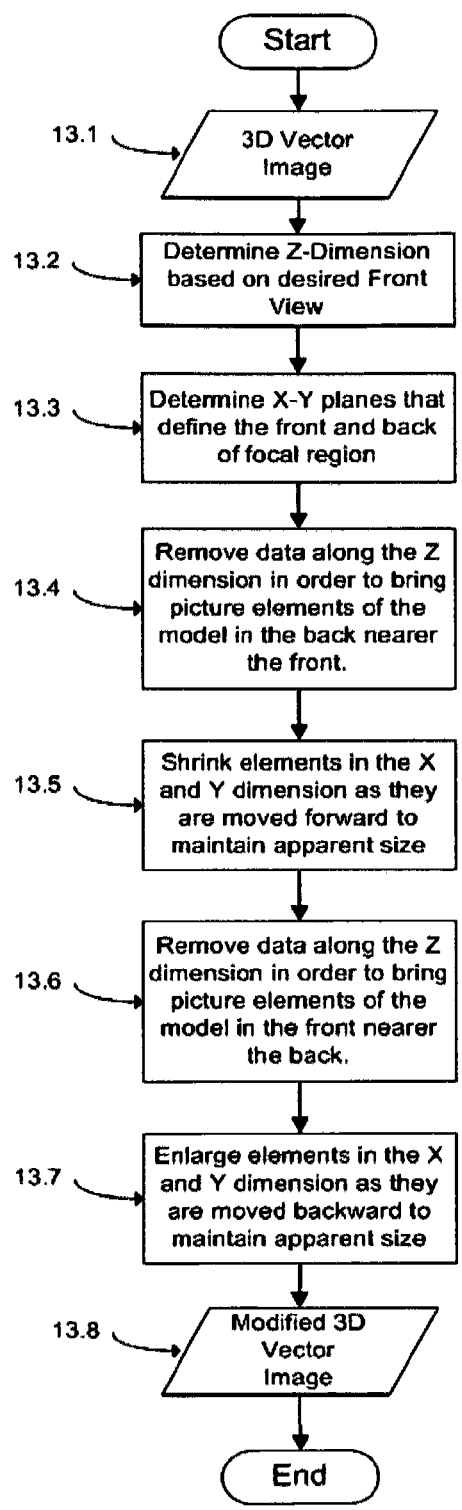

METHOD OF DISPLAYING AN ENHANCED THREE-DIMENSIONAL IMAGES

FIELD OF INVENTION

The present invention relates to an image-capturing apparatus and methods, a recording medium, a program and a display device that allows for the displaying of enhanced integral images. In particular, the present invention relates to an information processing apparatus and methods, a recording medium, a program and a display device and a display method which provide images of an object having enhanced three-dimensional resolution while allowing various viewpoints of the images.

The present invention also relates to creating three-dimensional images from three-dimensional modeling programs that create images in vector format.

The present invention also relates to creating three-dimensional images that animate as the viewers viewpoint changes.

The present invention also relates to a method of collapsing the Z-dimension of a virtual image in order to enhance the focus of a three-dimensional image.

The present invention also relates to a method of manufacturing a lens arrays to view integral photograph images and videos.

BACKGROUND OF THE INVENTION

Integral imaging is a form of three-dimensional imaging, and, along with holography and lenticular photography, are the three auto-stereoscopic methods of three-dimensional imaging (stereo imaging without the use of special glasses).

Over the years, numerous auto-stereoscopic devices and methods have been devised for producing images having all four physiological depth perception cues. The physiological cues are summarized in THREE DIMENSIONAL IMAGING TECHNIQUES (T. Okoshi, Academic Press 1976) and they are: accommodation, convergence, binocular parallax, and monocular movement parallax.

Accommodation is a cue given by the adjustment of the focal length of the eye's crystalline lens when an eye focuses on a particular object. Convergence is a cue given by the angle made by the two viewing axes of observer's eyes. Binocular parallax is a cue caused by the difference between the views seen by the two eyes of an observer. Monocular movement parallax is a cue observed when a person is moving and is caused by the changing view in each of the person's eyes. Accommodation and monocular parallax are available even when we see an object with a single eye.

There are several stereoscopic techniques that provide at least one of the physiological depth cues. Binocular stereoscopic technique is based on the idea that when two slightly different images are provided to two eyes of an observer then the binocular parallax will be observed. However, this technique does not provide any of the other three physiological cues.

Holography is a technique that reproduces all four physiological cues. Unfortunately, it is very difficult to generate and produce a synthetic hologram because a very fine interference pattern needs to be computed and reproduced. This makes it difficult to implement an auto-stereoscopic display based on the holography principle. Another disadvantage of the holography approach is that it records and reproduces a monochromatic light, thus the reproduced image has one dominant color.

Another stereoscopic image reproduction method is called parallax barrier technique. This method is based on the idea of showing different images on a display through a blocking barrier that has only one vertical slit open at a time. Each open slit has certain image shown through it. This technique, however, reduces display resolution and results in a low light display since the parallax barrier blocks most of the light.

Numerous efforts were made trying to create a stereoscopic display based on above techniques in combination with eye tracking methods. Eye tracking was part of the invention of a binocular screen that does not require any special glasses as in the U.S. Pat. No. 5,349,379. Eye tracking also allowed other researchers to optimize parallax barrier display. However, the disadvantages shown above still remain for every aforementioned type of the stereoscopic display.

Integral photography or integral imaging is another method that like holography provides all four physiological depth cues. However, images displayed using Integral Imaging methods are much easier to generate and to reproduce than hologram interference patterns.

Integral photography was first proposed by the physicist, Gabriel Lippmann, in 1908 to the French Academy (Lippmann, M. G., Compt. Rend. Acad. Sci. Vol. 146, 446 (1908)). Lippman proposed a method to record a complete spatial image on a photographic plate, with parallax in all directions, utilizing an array of small spherical convex lenses, all in a single exposure. In this method, later known as the direct method, an object or scene is recorded directly in front of the lens array.

Lippman performed several crude tests of his proposed method. In one test he used an array of 12 small lenses mounted in a rectangular frame. He stated that "in illuminating the plate one no longer sees individual microscopic images; they are replaced by a single (integral) image, which is seen under the same angle as the original subject." He went on to report that the resulting image changes form, just like the original object itself, depending on the position of the viewer, and also changes its angular dimensions with distance. (Lippmann, M. G., J. Soc. Franc. Phys, Vol. 69 (1912)).

Lippmann's theoretical suggestions, however, turned out to exhibit some fundamental problems when efforts were made to implement the concept by other researchers. Most importantly, the image as seen by the observer appeared pseudoscopic, having a reversed depth, where the foreground becomes the background and vice versa.

Later, one of the primary researchers of Integral photography was Roger de Montebello. His patented Integram process included extensive work on manufacturing lens arrays for viewing and for a two-step process camera. (see U.S. Pat. No. 3,503,315 which is incorporated by reference in its entirety). The camera was used to take the pseudoscopic image and for reversing the image to get the virtual image.

Thus, Roger de Montebello used an optical process to reverse the pseudoscopic image to get the virtual image with normal parallax. He did this by using the same camera to make the original image in a different configuration. The main problems with his process were as follows:

When reversing the image, the dark regions between the elemental images were visible in the final integrated image causing a "Chicken Wire" flaw viewable on top of the virtual image. Roger de Montebello tried to remedy this flaw by magnifying the images to reduce the size of the dark regions. However there was a limit to the possible magnification elemental images with his process because images would start to overlap neighboring elemental images.

Integrams also suffered from a somewhat narrow viewing angle. At certain viewing angles the virtual image would gradually flip to an entirely different virtual image over several degrees of viewing angle. This was called the "Imperial Crown Effect." The flip would occupy several degrees of viewing angle where the two images would chase each other.

Although a lot of work has gone into integral imaging, there are still numerous issues that prevent application and commercialization of this method of producing three-dimensional images. These problems include the "Chicken Wire" flaw and the "Imperial Crown Effect."

Research in this field later led to inventions of various displays based on the same principle of Integral Photography such as CRT and LCD auto-stereoscopic displays. All of these inventions, however, either exhibited same problems as de Montebello's device or proposed means to correct these problems which were not technically possible or were not commercially feasible.

Yet other devices of the prior art function using time multiplexing, requiring complex timing operations in the display system. Further, such display systems of the prior art are often cost-prohibitive.

Integral imaging consists of a two-dimensional array of distinct small images that is viewed by the observer through a lens array of spherical convex lenses. Each lens of the lens array sits on top of each image of the image array. When viewed together the images integrate into a unified image which mimics an actual light wavefront coming from a imaged object, and provides the viewer with a three-dimensional image which they move around and see different views.

Integral imaging provides benefits not seen with either holography or lenticular photography. Unlike holography, the local color of the subject in the image is not lost in integral imaging, and is as true to color as conventional photography.

Likewise, in lenticular photography the viewer sees dimensionality only from side to side or up and down, but not both in the same photograph. Thus, unlike lenticular photography, the three-dimensional effect of integral photography can be observed in all directions.

Thus, integral imaging had great potential to produce three-dimensional still and video images that could be used for a host of applications, including advertising, animations, art, video games, portraiture, still lifes, supplemental educational tools, home photos, dimensionalize consumer snapshots. However, up to now nobody could successfully produce high quality images that did not suffer from the problems listed above.

As can be seen, there is a need for a device and method that produces an auto-stereoscopic, three-dimensional image of superior quality, the image having all four physiological depth perception cues, as previously described. It is desirable to produce such an image without excessively limiting one's field of view of such an image. It is further desirable to readily and economically produce and generate such an image.

SUMMARY OF THE INVENTION

The present inventors have discovered, surprisingly, novel image-capturing apparatuses and methods, a recording medium, a program and a display device that allows for the displaying of enhanced integral images that overcome the problems associated with prior art methods of creating and displaying integral images.

The novel image-capturing apparatus and methods of the present invention overcomes the flaws in the "two step" method by digitizing the pseudoscopic images and then using improved methods to convert the images from the pseudoscopic images to virtual images.

According to a first aspect of the present invention, there is provided an image-capturing apparatus for creating and displaying enhanced high resolution auto-stereoscopic images. The image-capturing apparatus comprises an image acquisition means for acquiring a plurality of images of a subject; a registration means for locating the geometry of the array of elemental images by adjusting the grid cell size, and moving the grid to center all elemental images within a their respective grid cells; an image processing means for processing the images to improve the resolution and clarity of the displayed image; and a display control means for displaying on the basis of the data received from the image processing means an auto-stereoscopic image. As persons of skill in the art can appreciate that the registration means and the image processing means can be together or separate.

The acquisition means is capable of acquiring data of a plurality of images of the subject by any known means. If the plurality of images acquired by the acquisition means is not in a digital format the apparatus of the present invention includes a digitizing means to convert the images to a digital format.

The display control means is capable of displaying a plurality of images of the subject on the basis of data of a plurality of images of the image received from the image processing means.

The image-capturing apparatus according to the first aspect can further include conversion means for converting the images of the subject acquired by the acquisition means into erected images. The image-capturing apparatus according to the first aspect can further comprise enlargement/reduction processing means for enlarging or reducing the image of the subject, and of each elemental image. The image-capturing apparatus according to the first aspect can further include a "fish eye" (an extremely wide angle lens) processing means for enhancing the perceived depth of the integrated image by distorting the elemental images.

According to a second aspect of the present invention, there is provided an image-capturing method of an image-capturing apparatus for creating and displaying enhanced high resolution auto-stereoscopic images. The information processing method comprises: an acquisition step of acquiring a plurality of images of a subject; a registration step for locating the geometry of the array of elemental images by adjusting the grid cell size, and moving the grid to center all elemental images within a respective grid cell; an image processing step for processing the image to improve the resolution and clarity of the displayed image; and a display control step for displaying on the basis of the data received from the image processing means, an auto-stereoscopic image. As persons of skill in the art can appreciate that the registration step and the image processing step can be one step or multiple steps and can be together or separate.

The acquisition means is capable of acquiring data of a plurality of images of the subject by any known means. If the plurality of images acquired by the acquisition means is not in a digital format the apparatus of the present invention includes a digitizing means to convert the images to a digital format.

The display control step is capable of displaying a plurality of images of the subject on the basis of data of a plurality of images of the image received from the image processing means.

The image-capturing step according to the second aspect can further include conversion step for converting the images of the subject acquired by the acquisition means into erected images. The image-capturing method according to the invention can further comprise enlargement/reduction processing steps for enlarging or reducing the image of the subject, and of each elemental image. The image-capturing method according to the invention can further include a "fish eye" (an extremely wide angle lens) processing step for enhancing the perceived depth of the integrated image by distorting the elemental images.

According to a third aspect of the present invention, there is provided a recording medium on which is recorded a program which causes a computer to execute a process for controlling a display device such that enhanced high resolution auto-stereoscopic images are displayed. The program comprises: an acquisition step of acquiring a plurality of images of a subject; a registration step for locating the geometry of the array of elemental images by adjusting the grid cell size, and moving the grid to center all elemental images within a respective grid cell; an image processing step for processing the image to improve the resolution and clarity of the displayed image; and a display control step for displaying on the basis of the data received from the image processing means, an auto-stereoscopic image.

The acquisition means is capable of acquiring data of a plurality of images of the subject by any known means. If the plurality of images acquired by the acquisition means is not in a digital format the apparatus of the present invention includes a digitizing means to convert the images to a digital format.

The display control step for the recording medium on which is recorded a program which causes a computer to execute a process for controlling a display device such that enhanced high resolution auto-stereoscopic images are displayed is capable of displaying a plurality of images of the subject on the basis of data of a plurality of images of the image received from the image processing means.

The image-capturing step according to the third aspect can further include conversion step for converting the images of the subject acquired by the acquisition means into erected images. The recording medium on which is recorded a program which causes a computer to execute a process for controlling a display device such that enhanced high resolution auto-stereoscopic images are displayed can further comprise enlargement/reduction processing steps for enlarging or reducing the image of the subject, and of each elemental image. The recording medium on which is recorded a program which causes a computer to execute a process for controlling a display device such that enhanced high resolution auto-stereoscopic images are displayed can further include a "fish eye" (an extremely wide angle lens) processing step for enhancing the perceived depth of the integrated image by distorting the elemental images.

According to a fourth aspect of the present invention, there is provided a program which causes a computer to execute a process for controlling a display device such that enhanced high resolution auto-stereoscopic images are displayed. The program comprises: an acquisition step of acquiring a plurality of images of a subject; a registration step for locating the geometry of the array of elemental images by adjusting the grid cell size, and moving the grid to center all elemental images within a respective grid cell; an image processing step for processing the image to improve the resolution and clarity of the displayed image; and a display control step for displaying on the basis of the data received from the image processing means, an auto-stereoscopic image.

The acquisition means is capable of acquiring data of a plurality of images of the subject by any known means. If the plurality of images acquired by the acquisition means is not in a digital format the apparatus of the present invention includes a digitizing means to convert the images to a digital format.

The display control step for the program which causes a computer to execute a process for controlling a display device such that enhanced high resolution auto-stereoscopic images are displayed is capable of displaying a plurality of images of the subject on the basis of data of a plurality of images of the image received from the image processing means.

The image-capturing step according to the fourth aspect can further include conversion step for converting the images of the subject acquired by the acquisition means into erected images. The program which causes a computer to execute a process for controlling a display device such that enhanced high resolution auto-stereoscopic images are displayed of the fourth aspect of the invention can further comprise enlargement/reduction processing steps for enlarging or reducing the image of the subject, and of each elemental image.

The program which causes a computer to execute a process for controlling a display device such that enhanced high resolution auto-stereoscopic images are displayed of the fourth aspect of the invention can further include a "fish eye" (an extremely wide angle lens) processing step for enhancing the perceived depth of the integrated image by distorting the elemental images.

According to a fifth aspect of the present invention, there is provided an improved method for the manufacture of a lens array. The improved manufacturing method comprises: creating a mold of the desired cross-sectional shape of the lens; processing the mold to ensure that the surfaces are smooth and free of imperfections; placing the mold in a vacuum and pouring in a mold making composition under vacuum such as a two-part polyurethane mixture; curing the mold; extracting the lens from the mold; and adjoining the desired number of lens into a lens array.

According to a sixth aspect of the present invention, there is provided an image-capturing apparatus for creating and displaying enhanced high resolution auto-stereoscopic images of the first aspect of the invention wherein the image capturing means comprises a camera similar to the design set forth in U.S. Pat. No. 3,563,147. The resulting plurality of images are then digitized by the digitizing means before being registered by the registration means.

According to a seventh aspect of the present invention, there is provided an image-capturing apparatus for creating and displaying enhanced high resolution auto-stereoscopic images of the first aspect of the invention wherein the image capturing means comprises capturing a virtual image created by a three-dimensional modeling program.

According to an eighth aspect of the present invention, there is provided an image-capturing method for creating and displaying enhanced high resolution auto-stereoscopic images of the second aspect of the invention wherein the image capturing step includes capturing the image using a camera similar to the design set forth in U.S. Pat. No. 3,563, 147. The resulting image is then digitized by a digitizing means before being registered by the registration means.

According to a ninth aspect of the present invention, there is provided an image-capturing method for creating and displaying enhanced high resolution auto-stereoscopic images of the first aspect of the invention wherein the image capturing step comprises acquiring a virtual image created by a three-dimensional modeling program.

According to a tenth aspect of the present invention, there is provided a recording medium on which is recorded a program which causes a computer to execute a process for controlling a display device such that enhanced high resolution auto-stereoscopic images are displayed according to the third aspect of the invention wherein the acquisition step of acquiring a plurality of images of a subject comprises capturing the images using a camera similar to the design set forth in U.S.

Pat. No. 3,563,147. The resulting images are then digitized by the digitizing means before being registered by the registration means.

According to a eleventh aspect of the present invention, there is provided a recording medium on which is recorded a program which causes a computer to execute a process for controlling a display device such that enhanced high resolution auto-stereoscopic images are displayed according to the third aspect of the invention wherein the acquisition step of acquiring a plurality of images of a subject comprises acquiring a virtual image created by a three-dimensional modeling program.

According to a twelfth aspect of the present invention, there is provided a program which causes a computer to execute a process for controlling a display device of the fourth aspect of the invention wherein the acquisition step of acquiring a plurality of images of a subject is done by a camera similar to the design set forth in U.S. Pat. No. 3,563,147. The resulting images are then digitized by the digitizing means before being registered by the registration step.

According to a thirteenth aspect of the present invention, there is provided a program which causes a computer to execute a process for controlling a display device of the fourth aspect of the invention wherein the acquisition step of acquiring a plurality of images of a subject comprises acquiring a virtual image created by a three-dimensional modeling program.

According to a fourteenth aspect of the present invention, there is provided a recording medium on which is recorded a program which causes a computer to execute a process for creating enhanced high resolution auto-stereoscopic images are displayed. The program comprises: a registration step for locating the geometry of the array of elemental images by adjusting the grid cell size, and moving the grid to center all elemental images within a respective grid cell; an image processing step for processing the image to improve the resolution and clarity of the displayed image and a display control step for displaying on the basis of the data received from the image processing means, an auto-stereoscopic image.

According to a fifteenth aspect of the present invention, there is provided a program which causes a computer to execute a process for creating enhanced high resolution auto-stereoscopic images are displayed. The program comprises: a registration step for locating the geometry of the array of elemental images by adjusting the grid cell size, and moving the grid to center all elemental images within a respective grid cell; an image processing step for processing the image to improve the resolution and clarity of the displayed image; and a display control step for displaying on the basis of the data received from the image processing means, an auto-stereoscopic image.

According to a sixteenth aspect of the present invention, there is provided a recording medium on which is recorded a program which causes a computer to execute a process for controlling a display device such that enhanced high resolution auto-stereoscopic images are displayed. The program comprises: an acquisition step of acquiring a plurality of images of a subject; a registration step for locating the geometry of the array of elemental images by adjusting the grid cell size, and moving the grid to center all elemental images within a respective grid cell and an image processing step for processing the image to improve the resolution and clarity of the displayed image.

According to a seventeenth aspect of the present invention, there is provided a program which causes a computer to execute a process for controlling a display device such that enhanced high resolution auto-stereoscopic images are displayed. The program comprises: an acquisition step of acquiring a plurality of images of a subject; a registration step for locating the geometry of the array of elemental images by adjusting the grid cell size, and moving the grid to center all elemental images within a respective grid cell and an image processing step for processing the image to improve the resolution and clarity of the displayed image.

According to the eighteenth aspect of the invention, a digital image can be acquired from the 3D modeling programs. Example of such programs include but are not limited to Autodesk® Maya 2011 (Autodesk Media and Entertainment Division) (formerly Alias), or Blender (The Blender Foundation). These programs model three-dimensional objects in a digital space. Some of these programs, model in a dimensionless space where all the objects are sized relatively and are not related to real world measurements like meters or feet. In order to effectively acquire an integral image from these programs, a certain method has been invented using relative sizing as opposed to real world sizing. The relative sizing can be adjusted for different effects, but to create the three dimensional Integral effect and have the image in focus, the proportions listed below should be followed relatively closely. First, a hexagonal array is created in the digital space. This array is used to position the single image virtual cameras available in the 3D modeling program. The size of the array should be proportional to the size of the subject or area to be "photographed." Generally, the long dimension of the hexagonal array should be around 125% the size of the subject. This hexagonal array should also be approximately 40 hexagon rows by 50 hexagon columns. The hexagonal array should be placed close to the subject, a distance of about 11% the long dimension of the array. Next one or more virtual cameras with the same wide angle focal length are used to take pictures (elemental images) from each of the center points of all the hexagons in the hexagonal array. Care is taken to remember which elemental is taken from which cell in the array. Next, each elemental image is clipped using a hexagonal mask or image limiter. The size of the image limiter should limit the clipped image to be about 12% of the entire subject. Next, all the images are stitched together into a hexagonal array in a single digital image, according to where they were taken from the camera positioning array. This compound image can be processed similarly to a digital file coming from a real world camera. The only difference in the post acquisition process is that the elemental images do not need to be rotated 180 degrees because usually virtual cameras from 3D modeling program usually do this already. (See FIG. 11).

According to the nineteenth aspect of the invention, there is a method of collapsing the Z-dimension of a virtual image in order to enhance the focus of a three-dimensional image. The summation or viewed image seen in depth behind the optical lens screen array seldom completely resolves without part of the image being broken up or "shattered." These undesirable areas of visual noise appear either in front and/or behind the zone of the correctly focused part of the image. Collapsing the visual elements along Z-Dimension will bring these problem areas into focus zone and hence into focus. (See FIG. 12).

The inherent limitation of the lens array or screen is caused by the uniform and static focal length of each of the lenslets that make up the array. Changing in the thickness of the screen which shifts the image plane of all the lenslets, affords only a minimal improvement in focus of the virtual image behind the screen. The stationary focus on the image sandwiched so close to the screen remains as the primary limitation. In the past, this might have been resolved by photographing a forced perspective set.

The apparent depth of field within the digital image is shifted, by selecting the furthest Z-axis point and the closest Z-axis point which need to be focus. The image within these bounds is collapsed numerically removing unnecessary data along the Z-Dimension as needed. In addition, the X and Y dimensions of objects being compressed forward have to decrease linearly to maintain the same apparent image size, and the X and Y dimensions of objects being compressed backward have to increase linearly to maintain the same apparent image size. This allows that elements that were far away still appear to be far away even though they have moved forward, and that elements that were very close still appear to be close even though they have moved backward. (See FIG. 13).

The Z-dimension compression of illusionistic scale in the image behind the lens array greatly reduced reduces the appearance of "shattering." The compression of each object image in the virtual space compensates for the inherent limitation of the fixed focus screen. ([See Illustration to come]).

The novel apparatuses, methods, recording media and programs fix the "Chicken Wire" flaw and the "Imperial Crown Effect" flaw associated with the prior art.

In addition, there are two other unexpected results of the inventions listed above. First, by processing the pseudoscopic image and moving the process to the digital domain allows the size of the output image to be varied. For instance, Roger de Montebello's integrams were taken with 3/16" hexagonal grid, and could only be viewed by 3/16" viewing screen. The novel method allows the user to now use a 1/4" hexagonal grid as detailed more fully below, or to any size only limited by the quality and resolution of the original drum scan and the photographic resolution of the original.

Second, the inventions listed above the ability to change the magnification of each elemental image has the effect of moving the focal plane of the virtual image. Thus, if the user wants to bring into sharp focus certain details of the virtual image they would simply increase the magnification to move the virtual image forward or decrease magnification to move the virtual image backwards.

The high quality images produced by the aspects of the invention listed above can be used for a variety of purposes. Such uses include advertising, animations, art, video games, portraiture, still lifes, supplemental educational tools, home photos, dimensionalize consumer snapshots.

These and other objects of the present invention will become more readily apparent from consideration of the following summary and detailed description. Further areas of applicability of the present invention will become apparent from the detailed description provided hereinafter. It should be understood that the detailed description, while indicating the preferred embodiment of the invention, are intended for purposes of illustration only and are not intended to limit the scope of the invention.

BRIEF DESCRIPTION OF THE DRAWINGS

FIG. 3 is a flow chart illustrating the image-capturing of an image-capturing apparatus.

FIG. 4 is a flow chart illustrating the registration process of an image-capturing apparatus.

FIG. 8 is a flow chart illustrating the information processing step for each elemental image obtained by the image-capturing apparatus.

FIG. 9 is a block diagram showing a construction example of an image-capturing apparatus.

FIG. 10 is a depiction of the vacuum injection device for manufacturing the viewing screen.

FIG. 11 is a flow chart illustrating the image acquisition and processing method for images captured from a three-dimensional modeling program.

FIG. 13 is a flow chart illustrating the Z-dimension collapsing method of the present invention.

DETAILED DESCRIPTION OF EXEMPLARY EXAMPLES

Figure 1:
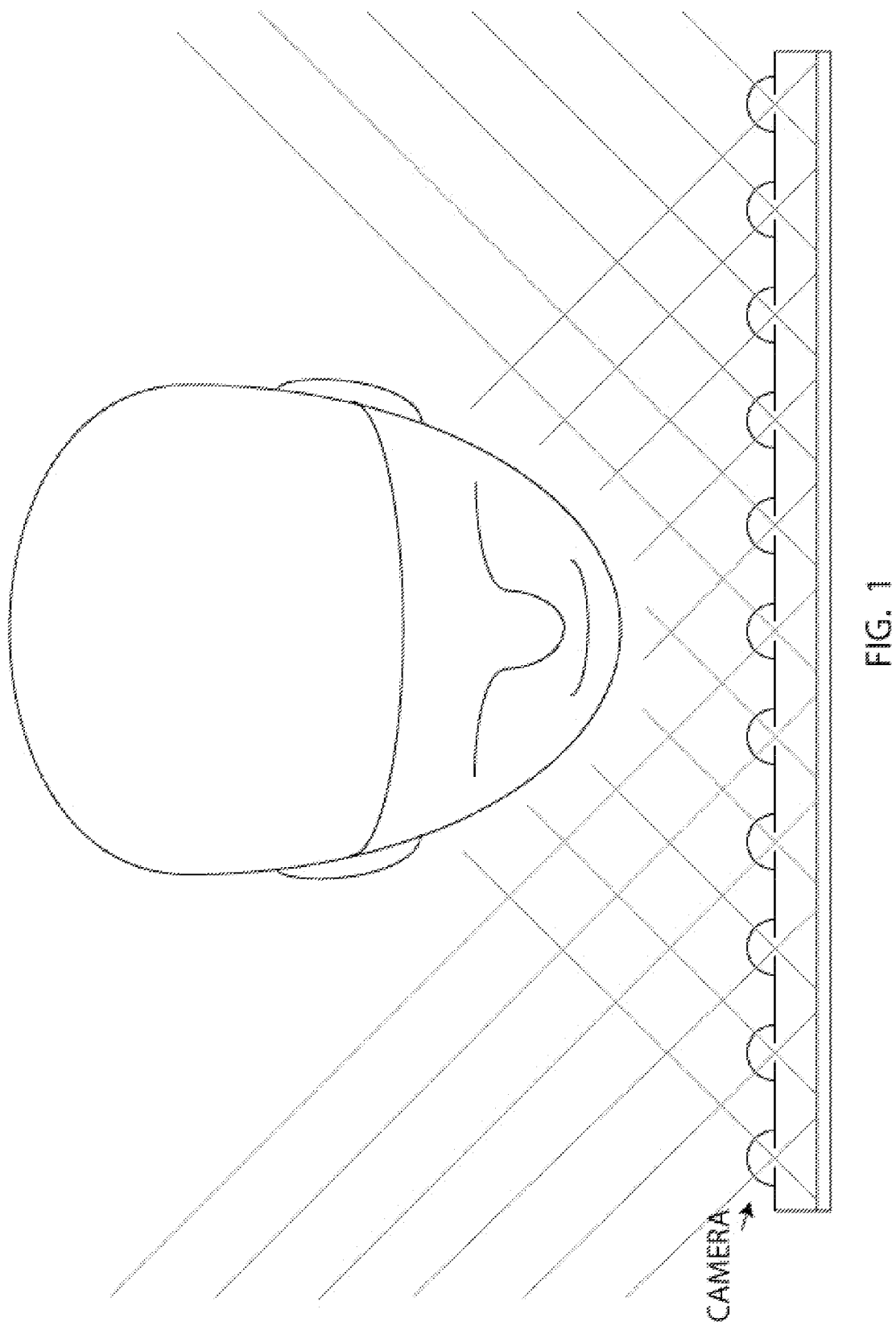
FIG. 1 illustrates an example of an imaging capturing system that uses a plurality of cameras to take a plurality of images of the subject. In this example, there is an array lens with apertures each capturing an image from different perspectives, focusing the image on a plane which records the images.

An image-capturing apparatus according to an embodiment of the present invention is an image-capturing processing apparatus for creating and displaying enhanced high resolution auto-stereoscopic images. The image-capturing apparatus comprises an image acquisition means for acquiring a plurality of images of the subject; a registration means for locating the geometry of the array of elemental images by adjusting the grid cell size, and moving the grid to center all elemental images within a their respective grid cells; an image processing means for processing the image to improve the resolution and clarity of the displayed image; and a display control means for displaying on the basis of the data received from the image processing means an auto-stereoscopic image. As persons of skill in the art can appreciate that the registration means and the image processing means can be together or separate.

The acquisition means is capable of acquiring data of a plurality of images of the subject by any known means. A person skilled in the art knows the type of cameras that can be used to make integral images. Exemplary acquisition means include integral imaging cameras, digital cameras, video cameras and any device capable of acquiring images of an object.

One acquisition means of the present invention is the camera disclosed in U.S. Pat. No. 4,732,453, the subject of which is incorporated by reference in its entirety. This camera requires the subject to be close to the camera (within a few inches), and requires very high lumen lighting due to the small apertures of the camera. The camera takes 8 inch by 10 inch positive chrome or negative film, and success has been found with 100 ASA Kodachrome as well as 400 ASA negative color film.

The film is then processed at a standard commercial professional photographic laboratory using the standard processing methods for color chromes or negatives.

In addition, acquisition means of the present invention also includes programs and methods that can create three-dimensional virtual images in vector format such as 3D modeling programs. Examples of 3D dimensional programs include but are not limited to Autodesk® Maya 2011 (Autodesk Media and Entertainment Division) (formerly Alias), Rhinoceros® (Robert McNeel & Associates) and solidThinking® (solidThinking Inc.).

Using these programs, three dimensional images in vector format can be created. These images then can be used in the image-capturing process to create enhanced three-dimensional.

The image-capturing apparatus according to the first aspect can further comprise digitizing processing means for converting, if necessary, the images acquired in the acquisition step into a digital format. The digitizing process or step is best done prior to registration.

The image-capturing apparatus according to the invention can further include conversion means for converting the images of the subject acquired by the acquisition means into erected images. This is necessary when the image capturing means is a lensed camera because when these devices capture images the images are inverted. Section 8.1 of FIG. 8 illustrates a process where an inverted image can be converted to an erect image.

The image-capturing apparatus according to the first aspect can further comprise enlargement/reduction processing means for enlarging or reducing the image of the subject, and of each elemental image. The present inventors have found that using the enlargement/reduction processing means for enlarging or reducing the image of the subject, and of each elemental image, images that do not have the drawbacks of the prior art can be created. The inventors have found that enlargement/reduction of each elemental image is best performed after the elemental images of an object have been registered. Once registered the enlargement/reduction of the image is performed until an acceptable quality image is formed using a lens array. The inventors have found that for most elemental images the sharpest images are obtained by enlarging the elemental images. The exact enlargement/reduction factor depends on the elemental images. However, the present inventors have discovered that enlargement factors of 1.09 to 1.29 work for most elemental images. Section 8.2 of FIG. 8 illustrates an example of an enlargement/reduction processing section for enlarging or reducing the image of the subject converted into the erected image.

The image-capturing apparatus according to the first aspect can further include a "fish eye" (an extremely wide angle lens) processing means for enhancing the perceived depth of the integrated image by distorting the elemental images. The present inventors have found that using the "fish eye" (an extremely wide angle lens) processing means can overcome the drawbacks associated with the prior art. The inventors have found that the "fish eye" processing is best performed after the elemental images of an object have been registered. In addition, the "fish eye" processing can occur separately or in conjunction with the enlargement/reduction processing of the elemental images. The amount of "fish eye" processing depends on the elemental images. The present inventors have discovered that "fish eye" processing means radius of curvature factors of 0.005 to 0.015 produce enhanced images for most elemental images. Section 8.3 of FIG. 8 illustrates an example of a "fish eye" processing section for enhancing the perceived depth of the integrated image by distorting the elemental images.

Figure 7:
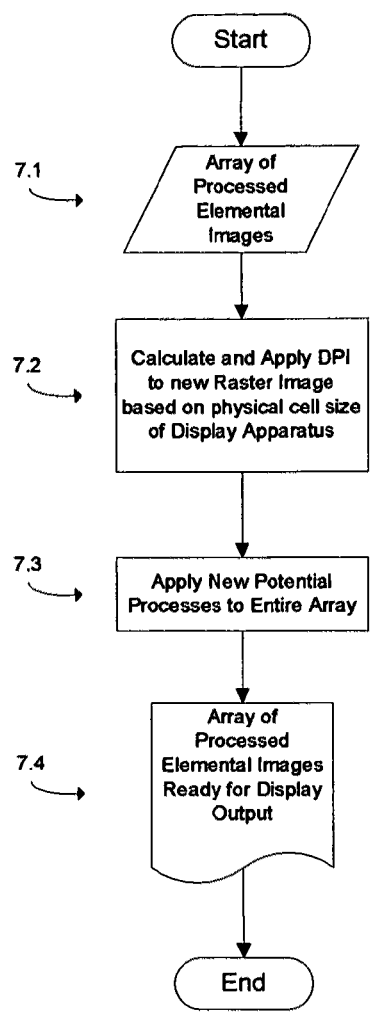
FIG. 7 is a flow chart illustrating the display control step for displaying an image after the information processing has occurred.

An image-capturing processing method of an image-capturing apparatus for controlling a display device for creating and displaying enhanced high resolution auto-stereoscopic images, according to an embodiment of the present invention comprises: an acquisition step of acquiring an image of a subject; a registration step for locating the geometry of the array of elemental images by adjusting the grid cell size, and moving the grid to center all elemental images within a respective grid cell (for example, the process of FIG. 4); an image processing step for processing the image to improve the resolution and clarity of the displayed image (for example, the process of FIG. 8); and a display control step for displaying on the basis of the data received from the image processing means, an auto-stereoscopic image (for example, the process of FIG. 7). As persons of skill in the art can appreciate that the registration step and the image processing step can be one step or multiple steps and can be together or separate.

Programs recorded on a recording medium according to embodiments of the present invention, each processing operation (but, one example) corresponding to a respective one of its steps is similar to that of the information processing method according to an embodiment of the present invention.

The acquisition step of the image-capturing method of the present invention is capable of acquiring data of a plurality of images of the subject by any known device or method. Exemplary acquisition steps include integral imaging cameras, digital cameras, video cameras and any device capable of acquiring an image of an object.

In addition, acquisition step of the present invention also includes programs and methods that can create three-dimensional virtual images in vector or raster format such as 3D modeling programs. Examples of 3D dimensional programs include but are not limited to Autodesk® Maya 2011 (Autodesk Media and Entertainment Division) (formerly Alias), Rhinoceros® (Robert McNeel & Associates) and solidThinking® (solidThinking Inc.).

Using these programs, three dimensional images in vector format can be created models in a vector format. These images then can be used in the image-capturing method to create enhanced three-dimensional age enhancement computer program can integrate with these programs. These programs have one or more virtual cameras that can make digitized images.

The image-capturing method according to the invention can further comprise digitizing processing step for converting, if necessary, the images acquired in the acquisition step into a digital format. The digitizing process or step is best done prior to registration.

The image-capturing method according to the invention can further include a conversion step for converting the image of the subject acquired by the acquisition means into an erected image. This step may be necessary when the image capturing step uses a lensed camera because when these devices capture images the images are inverted. Section 8.1 of FIG. 8 illustrates a process where an inverted image can be converted to an erect image. The image-capturing method according to the invention can further comprise enlargement/reduction processing steps for enlarging or reducing the image of the subject, and of each elemental image. The present inventors have found that by using the enlargement/reduction processing steps means for enlarging or reducing the image of the subject, and of each elemental image, images can be created that do not have the drawbacks of the prior art can be created. The inventors have found that enlargement/reduction of each elemental image is best performed after the elemental images of an object have been registered. Once registered the enlargement/reduction of the image is performed until an acceptable quality image is formed using a lens array. The inventors have found that for most elemental images the sharpest images are obtained by enlarging the elemental images. The exact enlargement/reduction factor depends on the elemental images. However, the present inventors have discovered that enlargement factors of 1.09 to 1.29 work for most elemental images. Section 8.2 of FIG. 8 illustrates an example of an enlargement/reduction processing section for enlarging or reducing the image of the subject converted into the erected image.

The image-capturing method according to the invention can further include a "fish eye" (an extremely wide angle lens) processing step for enhancing the perceived depth of the integrated image by distorting the elemental images. The present inventors have found that using the "fish eye" step can overcome the drawbacks associated with the prior art. The inventors have found that the "fish eye" processing step is best performed after the elemental images of an object have been registered. In addition, the "fish eye" processing step can occur separately or in conjunction with the enlargement/reduction processing steps of the elemental images. The amount of "fish eye" processing depends on the elemental images. The present inventors have discovered that "fish eye" processing means factors of 0.005 to 0.015 produce enhanced images for most elemental images. Section 8.1 of FIG. 8 illustrates an example of a "fish eye" processing section for enhancing the perceived depth of the integrated image by distorting the elemental images.

Programs recorded on a recording medium according to embodiments of the present invention, each processing operation (but, one example) corresponding to a respective one of its steps is similar to that of the information processing method according an embodiment of the present invention.

The embodiments of the present invention will be described below with reference to the accompanying drawings.

FIG. 1 is a schematic showing the theory behind creating auto-stereoscopic three-dimensional images from an object either real or virtual. Each camera which consists of a lens, aperture, image limiter and recording medium is placed at various locations described by a hexagonal grid. Hence, each camera has a distinct wide angle view of the object.

In FIG. 1 the light rays propagating from an object are captured by each camera and record a view of the object from its respective perspective dependent on its location on a hexagonal grid. Each image captured by a camera is called an elemental image.

Figure 2A:
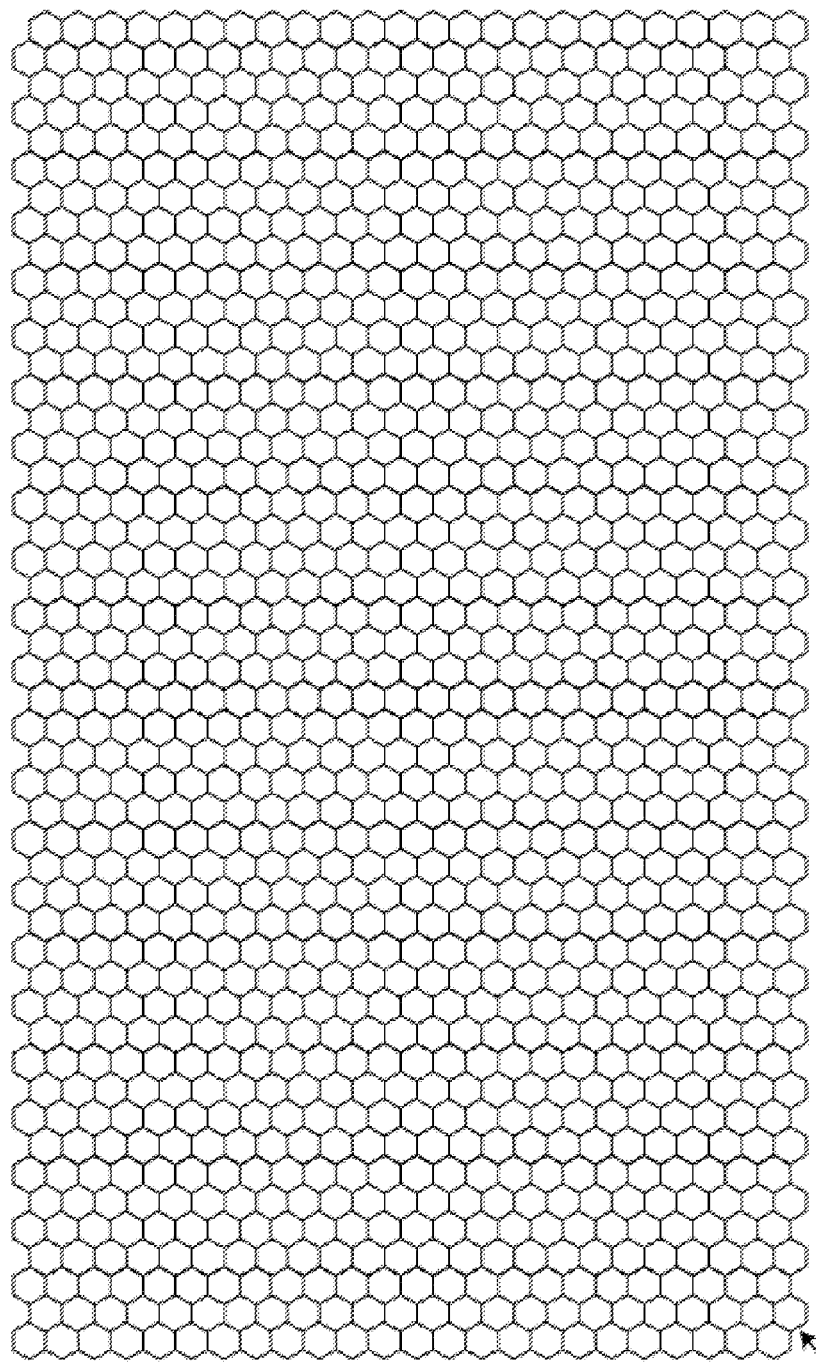
FIG. 2A illustrates a plane view of a lens array for displaying three dimensional images.

As shown in the cross-sectional view of FIG. 2A and side view 2B, a series of lenses (referred to as lenslets) are combined to form a lens array for displaying three-dimensional images. The shape of each lenslet can be square, circular, oval or polygonal. The present inventors have found that lenslets having a substantially hexagonal shape or cross-section give the best results.

FIG. 9 is a block diagram showing a construction example of an image-capturing apparatus. This apparatus requires a optical image system 9.1, a lighting system to provide illumination of the subject 9.2, a camera location system 9.3 for locating the camera at the appropriate perspectives of the scene, 9.4 an image recording system to record each elemental image, 9.5 a elemental image aggregating system to combine all the elemental images in a two dimensional array, and 9.6 a means to output to a digital file.

The operation of the image-capturing apparatus will be described below with reference to the flowcharts of FIGS. 3 and 4. First, the image acquisition processing of the image-capturing apparatus will be described below with reference to the flowchart of FIG. 3.

In step 3.1, the image acquisition means captures or creates an array of elemental images according to the type of acquisition means used. If a lensed camera is used an array of elemental images are captured using a lens array such that a series of images are captured. Alternatively, a caa can be moved along a track to take periodic pictures such that a series of images are created from different viewpoints. Further acquisition means include the creation of virtual images using a 3D dimension modeling program set forth above.

In step 3.2, the array of elemental images is collected. If the array of elemental images is not in digital format the array of elemental images needs to be converted to digital format by the digitizing means. It will be appreciated by those of skill in the art that steps 3.2 and 3.3 can be separate or in one step and can be done by separate systems or an integrated system.

Figure 6:
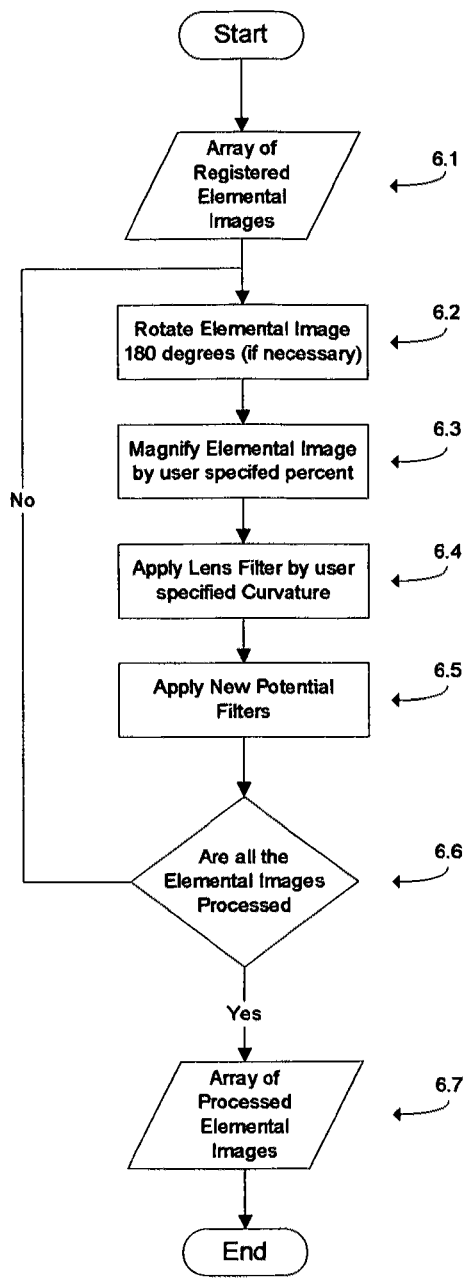
FIG. 6 is a flow chart illustrating the information processing of an image-capturing apparatus.

In step 3.3, the array of elemental images are registered according to the process shown in FIG. 4. In step 3.4, the each elemental image that has been registered is subject to information processing as shown in FIG. 6. Only when all the images have been processed does the process proceed to step 3.6. At step 3.6, the array of processed elemental images is outputted into the appropriate format to be displayed. The output and display can include a integral photograph displayed on a light box with a lens array screen placed in front, on a CRT, LED or plasma screen with a lens array screen placed adjacent or display method known to those skilled in the art.

FIG. 4 illustrates the registration processing of the images. In step 4.1 a virtual grid is overlayed upon the array of elemental images. The inventors have found that a grid with cells of substantially hexagonal cross-section works the best. In step 4.2 the size of the elemental images are adjusted so as to fill the cells of the virtual grid. Next, in step 4.3 the x and y positioning of the grid is adjusted so as to contain each elemental image in one cell of the grid with no overlap of an image into adjacent cells of the grid. In step 4.4, the rotation of the grid is adjusted so that each image is contained in the grid cell with no overlap of the image into any adjacent cell of the grid. In step 4.5, a determination is made to see that every elemental image is contained within one grid cell of the grid with no overlap of any image into adjacent cells. If all the images are within one grid cell the registration processing is concluded. If however, one or more images are not completely contained within their respective grid cells, the process of steps 4.2 through 4.5 are repeated until all the images are within one grid cell.

FIG. 8 is a block diagram showing a construction example of the image processing section FIG. 3. The image processing section 8.1 includes an inversion processing section 8.1 and an enlargement/reduction processing section 8.2. The inversion processing section 8.1 applies inversion processing centered about the optical axis of each of the lenslets to a respective one of the monocular images supplied from the monocular image generation section 3.1 of FIG. 3, and outputs the obtained monocular images to the enlargement/reduction processing section 8.2.

The enlargement/reduction processing section 8.2 enlarges or reduces the monocular images supplied from the inversion processing section 8.1, in accordance with an externally inputted raster image, and causes the buffer to store the obtained monocular images.

The image processing section may also include a "fisheye" processing section for enhancing the perceived depth of the integrated image by distorting the elemental images.

The image processing performed in step S4 of FIG. 3 will be described below with reference to the flowchart of FIG.

If the sequence of processing is to be executed by software, a program which constitutes the software is installed from a network or a recording medium into a computer incorporated in dedicated hardware, or into, for example, a general-purpose computer into which various programs can be installed so as to execute various kinds of functions.

This recording medium may be made of the removable medium which is a program-recorded medium to be distributed to users separately from the apparatus in order to provide a program to the users, for example, a magnetic disk (including a flexible disk), an optical disk (including a CD-ROM (Compact Disk-Read Only Memory) and a DVD, a magneto-optical disk or a semiconductor memory. Otherwise, the recording medium may be made of the program-recorded ROM which is to be provided to users in the state of being incorporated in the apparatus in advance, or the hard disk drive included in the storage section.

In addition, the steps described herein includes not only processing which is performed in a time-series manner in accordance with the described order, but also processing which is not necessarily processed in a time-series manner but is executed in parallel or individually.

In addition, the term "system" used herein represents the entire apparatus made of a plurality of devices.

The present invention contains subject matter related to U.S. Pat. Nos. 7,705,886 and 7,688,376, the entire contents of which being incorporated herein by reference.

It should be understood by those skilled in the art that various modifications, combinations, sub-combinations and alterations may occur factors insofar as they are within the scope of the appended claims or the equivalents thereof.

The method of the present invention processes the image to create high quality images that are free of the defects of the prior art, including the "chicken wire" and "imperial crown" defects.

Improved Method for Manufacturing a Viewing Screen

The inventors have also discovered a novel and improved method of manufacture of a viewing screen for use to create auto-stereoscopic images. The improved method consists of the following steps: a mold is made consisting of the desired cross-sectional shape of the viewing lens array. Any method, known or otherwise can be used to create the mold of lenslets. If necessary, the mold is processed so that the that the surfaces are smooth and free of imperfections. Cross-sectional shapes can include round, oval, hexagonal, polygonal or other shape. The inventors have found that a substantially hexagonal shape provides good viewing clarity and resolution. The mold is placed in a vacuum device and the compositions for creating molds is poured in under vacuum. Any composition can be used as long as it starts a liquid and then hardens to a such a degree that the resulting mold can be used as a mold. Preferred compositions included polymers and other polymer-like substances such as two-part polyurethane mixture (poly-optic 1411 from Polytek).

After the curing of the compositions until it is substantially hard the resulting lens was extracted from the mold. If necessary, the above process was repeated until the desired number of lens array tiles was created. If necessary, each of the tile's edges are cleaned so that all the tiles fit together well. If more than one lens array tile is necessary the tiles are adhered together and onto a planar clear material using an adhesive that would provide strong hold. Exemplary adhesives of the invention include cyanoacrylate glues and the like. Exemplary clear planar materials includes plastics and polymer materials.

A silicone rubber open back box mold was then made using lens array tile or the combined lens array tiles mounted on the plastic sheet back. The silicone mold was used then to make a complete screen by filling it with a polymer composition and then letting it cure until hard. In one embodiment of the invention the improved method of manufacture comprises the following:

The viewing screens are made by using a two part polyurethane plastic and a custom made mold. The mold was made using a multi-step process using high quality machine shop tools and machinist skills. There are a lot of commercially entities that provide such services. First a mold was made by drilling a hexagonal grid pattern from an AutoDesk AutoCAD file using a Kondia Vertical Milling Machine into a 1 inch thick surgical stainless steel plate which was $\frac{1}{6}^{th}$ the size of the final mold (22 cells wide by 17 cells high). The hexagonal grid pattern which formed the spherical faces of each lenslet was cleaned using a crescent shaped high precision tool head made of case hardened steel and electro-polished according to ASTM A-967 specifications to bring the curvature of the face (0.3125 inch diameter) to within $\frac{1}{1000}^{th}$ inch tolerance. Using a dental drill with a rubber ball coated with diamond dust, each spherical face is polished. A mold with a depth of 0.353 inch was custom built along the sides with microscopic venting [$\frac{1}{1000}^{th}$ inch square] and a glass back [6 inch by 6 inch by ½ inch floated plate glass].

Once the mold was built a double chamber vacuum injection device was used to house the mold. The two-part polyurethane mixture (poly-optic 1411 from Polytek) was mixed in a pre-chamber where a vacuum is applied to degas the mixture and then the using the pressure differential between the chamber that houses the mold and the pre-chamber the polyurethane mix was sucked into the mold by regulating the pressure in the two chambers. To accomplish this, the mold is mounted inside the lower chamber under the upper flange plate. (see FIG. 10). The upper and lower flange plates are sealed with O-rings against the end of a polycarbonate tube. The upper degassing chamber is mounted on top of the lower chamber, and the chambers are separated via a ball valve. Both upper and lower chambers have vacuum gauges to monitor the vacuum pressure in the isolated chambers, separately. There are throttle control valves for controlling the vacuum pressure separately in each chamber. The material (two-part polyurethane) is mixed in a separate container, and poured into the upper chamber. Then, the chamber is sealed from the ambient atmosphere with a lid and O-rings. The vacuum pump is turned on and both chambers are brought down to approximately −29 PSI of vacuum pressure. As the pressure is slowly brought down, the upper chamber with the material in it is being degassed, while concurrently the lower chamber pressure is being prepared to accept the material into the mold. When all of the air is removed from the upper degassing chamber, then the ball valve is opened slowly to allow for the material to enter into the mold and fill out into all of the details of the mold. By varying the pressure in the two chambers the material is drawn from the upper chamber to the lower chamber and ultimately into the mold. The mold has vents that remove residual air bubbles formed when the material is transferred from the upper chamber to the lower chamber. When all the bubbles have disappeared, the pressure is slowly released from near vacuum to normal atmospheric pressure. After curing 4 hours the resulting lens was extracted from the mold.

The above process was followed until six element tiles were made using the above process. Each tile was then filed around the perimeter to make a tight fit with the other tiles. The six elements were then glued together using a cyanoacrylate glue [an example of such glue includes LOCTITE® 4011] onto a ¾ by 17 by 14 inches acrylic sheet back, made by Arkema, Inc. Plexiglass G. A silicone rubber [Silicones Inc. P50] open back box mold was then made using the combined elements mounted on the acrylic sheet back. The silicone mold was used then to make a complete screen by filling it with poly-optic 1411 with a Poly-Optic 14 Series Part R Retarder from Polytek Development Corporation cured for 18 hours.

Detailed Description of the Drawings

FIG. 1 illustrates an example of an imaging capturing system that uses a plurality of cameras to take a plurality of images of the subject. In this example, there is an array lens with apertures each capturing an image from different perspectives, focusing the image on a plane which records the images.

Figure 2B:
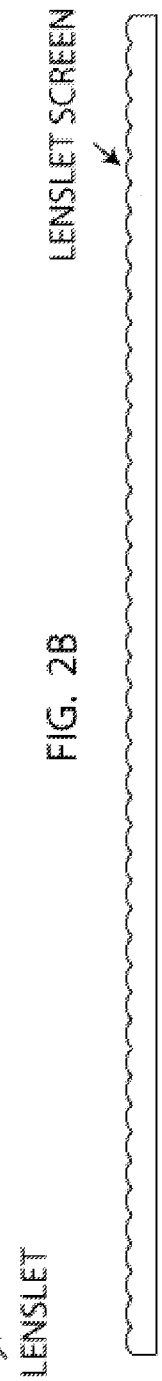
FIG. 2B illustrates a cross-sectional view of a lens array for displaying three dimensional images.

FIG. 2A illustrates a plane view of a lens array for displaying three dimensional images. In this figure the cells are hexagonal in cross-section. FIG. 2B illustrates a cross-sectional view of a lens array for displaying three dimensional images. As shown in the cross-sectional view of FIG. 2A and side view 2B, a series of lenses (referred to as lenslets) are combined to form a lens array for displaying three-dimensional images. The shape of each lenslet can be square, circular, oval or polygonal. In FIGS. 2A and 2B the lenslets have a substantially hexagonal cross-section. The present inventors have found that lenslets having a substantially hexagonal shape or cross-section give the best results.

FIG. 3 is a flow chart illustrating the image-capturing of an image-capturing apparatus. In step 3.1 the plurality of images are captured using any known means resulting in an array of elemental images (3.2). Next, the array of elemental images is registered (step 3.3) by locating a virtual grid over the array of elemental images to create an array of registered elemental images (3.4). Next, each of the registered elemental images is processed (step 3.5) to enhance the images (3.6). The processed array of elemental images are then display processed (step 3.7) to allow the images to be displayed (3.9). A person of skill in the art will appreciate that not all the steps need to be carried out and that the steps can be performed in any order.

FIG. 4 is a flow chart illustrating the registration process as shown in step 3.3 of FIG. 3. To register the array of elemental images (4.1) a virtual grid is placed over the array of elemental images. First, the grid elemental images size of the cells of the virtual grid are adjusted so that each cell would encompass the elemental image. (step 4.2). Next, the x and y orientation of the grid is adjusted to align each elemental image entirely within each cell of the grid (step 4.3). Next the rotation of the grid is adjusted if necessary to align each elemental image entirely within the boundaries of its respective grid cell (step 4.4). In step 4.5, it is determined whether each grid overlays the array of elemental images so that each elemental image is contained within a grid cell. If one or more elemental images overlap the grid cells the process is repeated until the grid sits perfectly over the array of elemental images. When the grid sits perfectly over the array of elemental images the array of elemental images is registered according to the invention (4.6). A person of skill in the art will appreciate that not all the steps need to be carried out and that the steps can be performed in any order.

Figure 5:
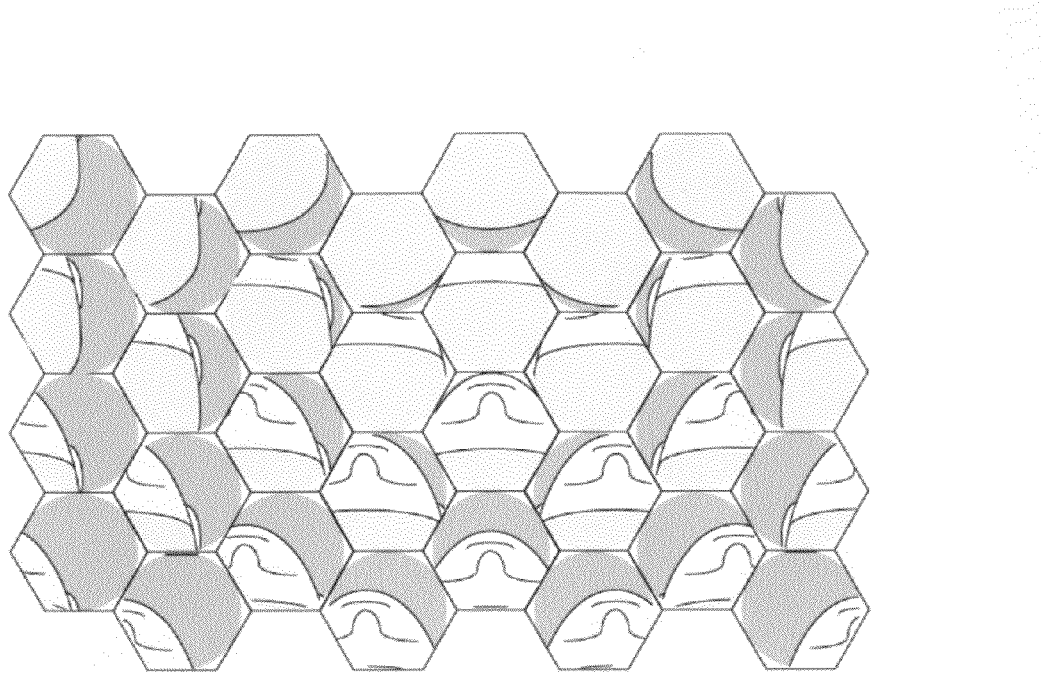
FIG. 5 illustrates a perspective view of the registration means where the images are being located within a virtual grid.

FIG. 5 illustrates a perspective view of the registration means where the images are being located within a virtual grid.

FIG. 6 is a flow chart illustrating one possible process for information processing of an image-capturing apparatus of step 3.5 of FIG. 3. The information processing starts with an array of elemental images is registered (step 6.1). The steps 6.2 through 6.5 can be performed on each elemental image. A person of skill in the art will appreciate that not all the steps need to be carried out and that the steps can be performed in any order. In FIG. 6, each elemental images is rotated 180 degrees if necessary to get an erected images (6.2). The elemental image is then magnified to the user's specified percent (6.3). A lens filter can then be applied with a specified curvature to enhance the perceived depth of the integrated image by distorting the elemental images (6.4). Other filters or processing can be performed to enhance the quality of the elemental image (6.5). The process is repeated until each elemental image has been processed (6.6).

FIG. 7 is a flow chart illustrating the display control step shown in step 3.7 of FIG. 3. The process starts with an array of processed elemental images (7.1). Then the proper dots per inch (DPI) for the array of elemental images is determined based upon the physical cell size of the display apparatus and this calculated DPI is applied to the raster image (7.2). Additional display process steps to enhance the display of the images are then carried out if necessary (7.3) and the array of processed elemental images is ready to be displayed (7.4). A person of skill in the art will appreciate that not all the steps need to be carried out and that the steps can be performed in any order. A person of skill in the art will appreciate that not all the steps need to be carried out and that the steps can be performed in any order.

FIG. 8 is a flow chart illustrating steps 6.2 to 6.5 of FIG. 6.

FIG. 9 is a block diagram showing a construction example of an image-capturing apparatus. This apparatus requires an optical image system (9.1), a lighting system to provide illumination of the subject (9.2), a camera location system (9.3) for locating the camera at the appropriate perspectives of the scene (9.4), an image recording system to record each elemental image (9.5), an elemental image aggregating system to combine all the elemental images in a two dimensional array, and a means to output to a digital file (9.6). A person of skill in the art will appreciate that not all the steps need to be carried out and that the steps can be performed in any order.

FIG. 10 is a depiction of one embodiment of the vacuum injection device for manufacturing the viewing screen. This device requires an upper chamber with a gauge to measure the pressure (10.1). This is used to degass the plastic mixture. There is also a lower chamber (10.2) which is where the mold is placed also with a gauge to measure the pressure. Both chambers are brought to a vacuum. After the material is degassed in the upper chamber. The material is than pushed into the mold in the lower chamber by opening the ball valve (10.3), and increasing the pressure in the upper chamber while maintaining the vacuum in the lower chamber. A person of skill in the art will appreciate how to use gauges, valves and pumps to do this.

FIG. 11 is a flow chart illustrating the image acquisition and processing method for images captured from a three-dimensional modeling program, including Autodesk® Maya 2011 (Autodesk Media and Entertainment Division) (formerly Alias), or Blender (The Blender Foundation). First, a hexagonal array is created in the digital space (11.2). This array is used to position the single image virtual cameras available in the 3D modeling program. The size of the array should be proportional to the size of the subject or area to be "photographed." Generally, the long dimension of the hexagonal array should be around 125% the size of the subject. This hexagonal array should also be approximately 40 hexagon rows by 50 hexagon columns. The hexagonal array should be placed close to the subject (11.3), a distance of about 11% the long dimension of the array. Next, the focal length for the virtual cameras is set. (11.4). Then one or more virtual cameras with the same wide angle focal length are used to take pictures (elemental images) from each of the center points of all the hexagons in the hexagonal array. Care is taken to remember which elemental is taken from which cell in the array. Next, each elemental image is clipped using a hexagonal mask or image limiter (11.5). The size of the image limiter should limit the clipped image to be about 12% of the entire subject. Next, all the images are stitched together into a hexagonal array in a single digital image, according to where they were taken from the camera positioning array (11.7). This compound image can be processed similarly to a digital file coming from a real world camera. The only difference in the post-acquisition process is that the elemental images do not need to be rotated 180 degrees because usually virtual cameras from 3D modeling program usually do this already. A person of skill in the art will appreciate that not all the steps need to be carried out and that the steps can be performed in any order.

Figure 12:
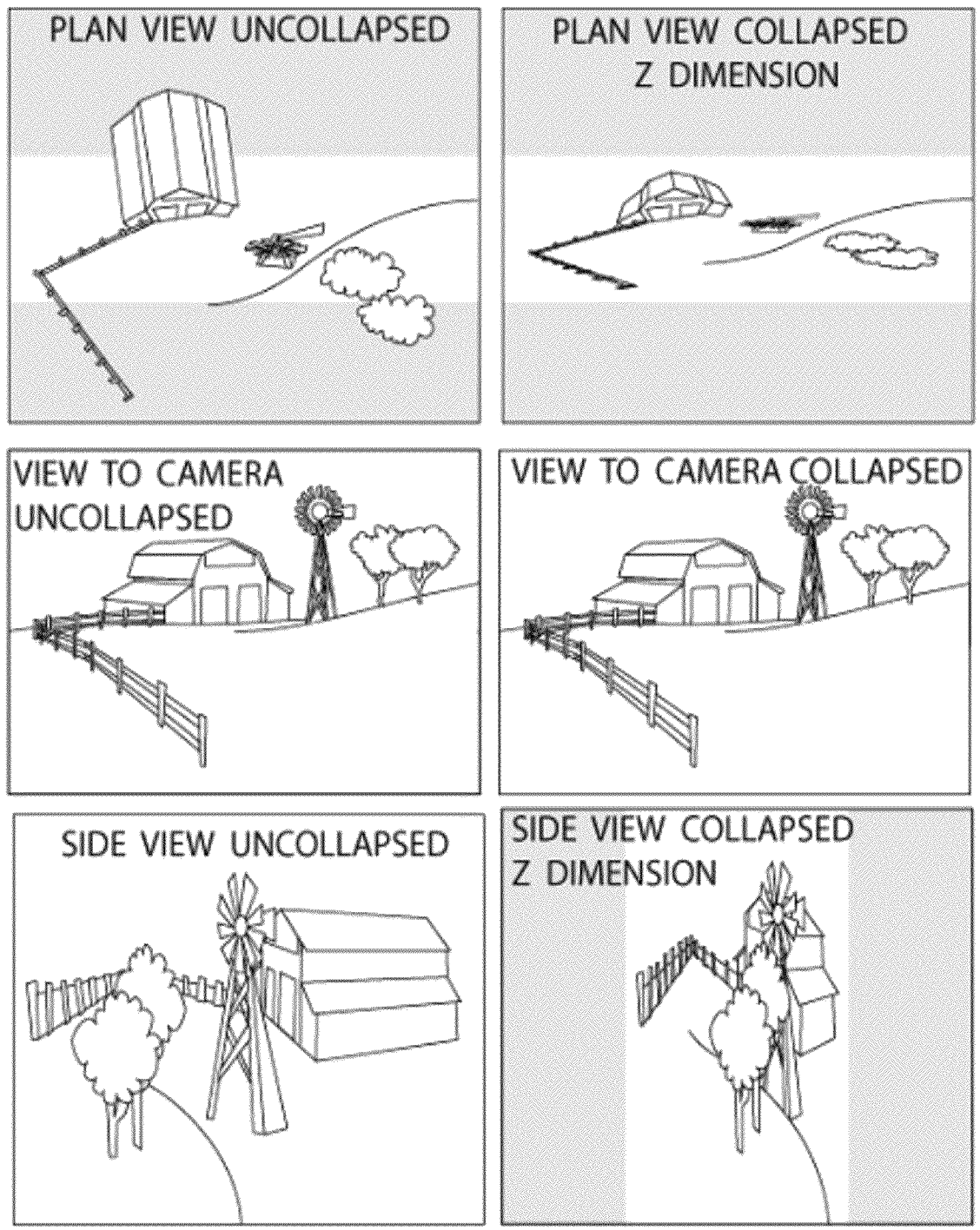
FIG. 12 shows three views of an image with the Z-dimension uncollapsed and with the Z-dimension collapsed according to the method of the invention.

FIG. 12 shows three views of an image with the Z-dimension uncollapsed and with the Z-dimension collapsed according to the method of the invention.

FIG. 13 is a flow chart illustrating an example of the Z-dimension collapsing method of the present invention. Starting with a 3D vector image (13.1) the Z-dimension is determined based upon the desired front view (13.2). Next, the X-Y plane is determined that define the front and back of the focal region (13.3). Next, the data along the Z-dimension is selectively removed in order to bring picture elements of the model in the back nearer the front (13.4). The elements in the X and Y dimensions are then reduced as they are moved forward to maintain the apparent size of the imaged objects (13.5). The data along the Z-dimension is selectively removed in order to bring the picture elements of the model in the front nearer the back (13.6). Next, the elements in the X and Y dimensions are enlarged as they are moved backward to maintain apparent size (13.7) resulting in a modified 3D vector image (13.8), A person of skill in the art will appreciate that not all the steps need to be carried out and that the steps can be performed in any order.

We claim:

1. An image-capturing apparatus for creating and displaying enhanced high resolution auto-stereoscopic images comprising:
    an image acquisition means for acquiring a plurality of non-overlapping images of a subject from a plurality of viewpoints to create an array of elemental images;
    a registration means for overlaying a virtual grid upon the array of elemental images, adjusting the grid cell size, and moving the elemental images to center them within their respective grid cells to ensure each image contained in a grid cell with no overlap of the image into any adjacent cell of the grid;
    an image processing means for enhancing the perceived depth of an integrated image by rotating, magnifying and filtering the elemental images from a registration mean;
    a display control means for displaying the array of processed elemental image from the image processing means into an auto-stereoscopic image.

2. The image-capturing apparatus according to claim 1 further comprising a conversion means for converting the images of the subject acquired by the acquisition means into erected images.

3. The image-capturing apparatus according to claim 2 further comprising a fish eye (an extremely wide angle lens) processing means for enhancing the perceived depth of the integrated image by distorting the elemental images.

4. The image-capturing apparatus according to claim 1 further comprising an enlargement/reduction processing means for enlarging or reducing each of the elemental images comprising the image of the subject.

5. The image-capturing apparatus according to claim 1 further comprising a fish eye (an extremely wide angle lens) processing means for enhancing the perceived depth of the integrated image by distorting the elemental images.

6. An image-capturing apparatus according to claim 1 wherein the image acquisition means comprises an integral camera.

7. An image-capturing apparatus according to claim 1 wherein the image acquisition comprises capturing a virtual image created by a three-dimensional modeling program.

8. The image capturing apparatus of claim 1 wherein the display control means is a matching lens array.

9. An image-capturing method for creating and displaying enhanced high resolution auto-stereoscopic images comprising: an acquisition step of acquiring a plurality of non-overlapping images of a subject from a plurality of viewpoints;
    a registration step for overlaying a virtual grid upon the array of elemental images, adjusting the grid cell size, and moving the elemental images to center them within their respective grid cells to ensure each image contained in a grid cell with no overlap of the image into any adjacent cell of the grid;
    an image processing step for enhancing the perceived depth of an integrated image by rotating, magnifying and filtering the elemental images from the registration step; and
    a display control means for displaying the array of processed elemental image from the image processing step into an auto-stereoscopic image format.

10. The image-capturing method according to claim 9 further comprising a conversion step for converting the image of the subject acquired by the acquisition means by erecting each elemental image to correct the summation image from pseudo-scopic problems.

11. The image-capturing method according to claim 10 further comprising enlargement/reduction processing steps for enlarging or reducing each elemental image which comprise the image of the subject.

12. The image-capturing method according to claim 9 further comprising enlargement/reduction processing steps for enlarging or reducing each elemental image which comprise the image of the subject.

13. The image-capturing method according to claim 9 further comprising a fish eye (an extremely wide angle lens) processing step for enhancing the perceived depth of the integrated image.

14. The image-capturing method according to claim 11 further comprising a fish eye (an extremely wide angle lens) processing step for enhancing the perceived depth of the integrated image.

15. An image-capturing method according to claim 9 wherein the image acquisition step includes capturing the images using an integral camera.

16. An image-capturing method according to claim 9 wherein the image acquisition step comprises acquiring a plurality of non-overlapping elemental images from a plurality of viewpoints of a virtual image created by a three-dimensional modeling program.

17. A non-transitory recording medium on which is recorded a program which causes a computer to execute a process for controlling a display device such that enhanced high resolution auto-stereoscopic images are displayed comprising: an acquisition step of acquiring a plurality of non-overlapping images of a subject from a plurality of viewpoints;

a registration step for overlaying a virtual grid upon the array of elemental images, adjusting the grid cell size, and moving the elemental images to center them within their respective grid cells to ensure each image contained in a grid cell with no overlap of the image into any adjacent cell of the grid;

an image processing step for enhancing the perceived depth of an integrated image by rotating, magnifying and filtering the elemental images from the registration step; and a display control means for displaying the array of processed elemental image from the image processing step into an auto-stereoscopic image format.

18. A non-transitory recording medium according to claim 17 further comprising a conversion step for converting the images of the subject acquired by the acquisition means by erecting each elemental image to correct the summation image from pseudo-scopic problems.

19. A non-transitory recording medium according to claim 18 further comprising enlargement/reduction processing steps for enlarging or reducing each elemental image which comprise the image of the subject.

20. A non-transitory recording medium according to claim 19 further comprising a "fish eye" (an extremely wide angle lens) processing step for enhancing the perceived depth of the integrated image by distorting the elemental images.

21. A non-transitory recording medium according to claim 17 further comprising enlargement/reduction processing steps for enlarging or reducing each elemental image which comprise the image of the subject.

22. A non-transitory recording medium according to claim 17 further comprising a "fish eye" (an extremely wide angle lens) processing step for enhancing the perceived depth of the integrated image by distorting the elemental images.

23. A non-transitory recording medium according to claim 17 wherein the acquisition step of acquiring a plurality of images of a subject comprises capturing the images using an integral camera.

24. A non-transitory recording medium according to claim 17 wherein the acquisition step of acquiring a plurality of images of a subject comprises acquiring a virtual image created by a three-dimensional modeling program.

25. A program stored on a non-transitory computer-readable medium which causes a computer to execute a process for controlling a display device such that enhanced high resolution auto-stereoscopic images are displayed comprising:

an acquisition step of acquiring a plurality of non-overlapping images of a subject from a plurality of viewpoints;

a registration step for overlaying a virtual grid upon the array of elemental images, adjusting the grid cell size, and moving the elemental images to center them within their respective grid cells to ensure each image contained in a grid cell with no overlap of the image into any adjacent cell of the grid;

an image processing step for enhancing the perceived depth of an integrated image by rotating, magnifying and filtering the elemental images from the registration step; and a display control means for displaying the array of processed elemental image from the image processing step into an auto-stereoscopic image format.

26. A program stored on a non-transitory computer-readable medium according to claim 25 further comprising a conversion step for converting the image of the subject acquired by the acquisition means by erecting each elemental image to correct the summation image from pseudo-scopic problems.

27. A program stored on a non-transitory computer-readable medium according to claim 26 further comprising enlargement/reduction processing steps for enlarging or reducing each elemental image which comprise the image of the subject.

28. A program stored on a non-transitory computer-readable medium according to claim 25 further comprising enlargement/reduction processing steps for enlarging or reducing each elemental image which comprise the image of the subject.

29. A program stored on a non-transitory computer-readable medium according to claim 25 further comprising a "fish eye" (an extremely wide angle lens) processing step for enhancing the perceived depth of the integrated image by distorting the elemental images.

30. A program stored on a non-transitory computer-readable medium according to claim 25 wherein the acquisition step of acquiring a plurality of images of a subject is done by an integral camera.

31. A program stored on a non-transitory computer-readable medium according to claim 25 wherein the acquisition step of acquiring a plurality of images of a subject comprises acquiring a virtual image created by a three-dimensional modeling program.

32. A non-transitory recording medium on which is recorded a program which causes a computer to execute a process for creating enhanced high resolution auto-stereoscopic images that are displayed comprising:

a registration step for overlaying a virtual grid upon the array of elemental images, adjusting the grid cell size, and moving the elemental images to center them within their respective grid cells to ensure each image contained in a grid cell with no overlap of the image into any adjacent cell of the grid;

an image processing step for enhancing the perceived depth of an integrated image by rotating, magnifying and filtering the elemental images from the registration step; and a display control means for displaying the array of processed elemental image from the image processing step into an auto-stereoscopic image format.

33. A program stored on a non-transitory computer-readable medium which causes a computer to execute a process for creating enhanced high resolution auto-stereoscopic images that are displayed comprising:

a registration step for overlaying a virtual grid upon the array of elemental images adjusting the grid cell size, and moving the elemental images to center them within their respective grid cells to ensure each image contained in a grid cell with no overlap of the image into any adjacent cell of the grid;

an image processing step for enhancing the perceived depth of an integrated image by rotating, magnifying and filtering the elemental images from the registration step; and a display control means for displaying the array of processed elemental image from the image processing step into an auto-stereoscopic image format.

34. A non-transitory recording medium on which is recorded a program which causes a computer to execute a process for controlling a display device such that enhanced high resolution auto-stereoscopic images are displayed comprising:

a registration step for overlaying a virtual grid upon the array of elemental images, adjusting the grid cell size, and moving the elemental images to center them within their respective grid cells to ensure each image contained in a grid cell with no overlap of the image into any adjacent cell of the grid; and an image processing step for enhancing the perceived depth of an integrated image by rotating, magnifying and filtering the elemental images from the registration step.

35. A program stored on a non-transitory computer-readable medium which causes a computer to execute a process for controlling a display device such that enhanced high resolution auto-stereoscopic images are displayed comprising: an acquisition step of acquiring a plurality of non-overlapping images of a subject from a plurality of viewpoints;

a registration step for overlaying a virtual grid upon the array of elemental images, adjusting the grid cell size, and moving the elemental images to center them within their respective grid cells to ensure each image contained in a grid cell with no overlap of the image into any adjacent cell of the grid; and an image processing step for enhancing the perceived depth of an integrated image by rotating, magnifying and filtering the elemental images from the registration step.

36. A method for displaying enhanced high resolution three-dimensional images without viewing aids or glasses comprising:

acquiring a plurality of non-overlapping images of a subject from a plurality of viewpoints;

registering by overlaying a virtual grid upon the array of elemental images, adjusting the grid cell size, and moving the elemental images to center them within their respective grid cell to ensure each image contained in a grid cell with no overlap of the image into any adjacent cell of the grid;

processing the images to enhance the perceived depth of an integrated image by rotating, magnifying and filtering the elemental images; and displaying an auto-stereoscopic image by placing a matching lens array over the array of processed elemental images.

37. An image capturing method for capturing non-overlapping images from a plurality of viewpoints from a subject in the real world or created with a three-dimensional computer modeling program comprising:

positioning a plurality of real or virtual cameras using a grid which defines the number and locations of all the real or virtual cameras used to capture the subject;

capturing a plurality of non-overlapping images from multiple viewpoints of the subject with the real or virtual cameras to create a series of elemental images that correspond to the multiple viewpoints of the grid;

combining all the elemental images together into an array of elemental images according to the position in the grid;

registering the array of elemental images by overlaying a virtual grid upon the array of elemental images, adjusting the grid cell size, and moving the elemental images to center them within their respective grid cells to ensure each image contained in a grid cell with no overlap of the image into any adjacent cell of the grid;

processing the images to enhance the perceived depth of an integrated image by rotating, magnifying and filtering the elemental images from the registration step; and using a display control means to display an auto-stereoscopic image from the array of elemental images.

38. The method of claim 37 wherein the virtual cameras are positioned at the center points of the grid cells of the grid.

39. The method of claim 37, further comprising clipping each elemental image using a mask or image limiter.

40. The method of claim 37 wherein each virtual camera in the grid captures a single image.

41. A method of scaling the Z-dimension of a 3-D virtual subject in order to enhance the focus and depth of field when the grid of elemental images is formed, and thus the focus and depth of field when the grid of elemental images behind the grid of lenses is viewed as a summation image by a viewer, comprising:

selecting the furthest Z-axis values and the closest Z-axis values;

scaling the 3-D vertices of a virtual subject in the Z-axis only;

resizing the X and Y dimensions in order to better maintain the apparent spatial relationship of the 3-D image after it has been scaled in the Z-dimension; and creating a corresponding grid of elemental images using a grid of viewpoints so that the elemental images can be arranged in a grid beneath a corresponding array of lenses enabling a viewer to see a summation image that appears to contain depth.

42. The method of claim 41 further comprising: The X and Y dimensions of the 3-dimensional wire frame model are scaled larger when the Z-distance lies further away from the viewpoints, and scaled smaller when the Z-distance lies closer to the viewpoints.

43. The method of claim 41 further comprising positioning the plurality of non-overlapping images in a grid according to the location of the viewpoint of each image and positioning a lens array over the plurality of digital images.

44. The method of claim 41 wherein resizing the X and Y dimensions comprises expanding the X and Y dimensions of objects that are compressed backward in the Z dimension to maintain the same apparent image size and compressing the X and Y dimensions of objects that are compressed forward in the Z- dimension to maintain the same apparent image size.

* * * * *